United States Patent [19]

Grushkin

[11] 4,432,405

[45] Feb. 21, 1984

[54] PRESSURE CUFF TIRE PUMP DEVICE

[76] Inventor: Harold Grushkin, 25 Atlantic Ave., Nanuet, N.Y. 10954

[21] Appl. No.: 424,395

[22] Filed: Sep. 27, 1982

[51] Int. Cl.$^3$ .................. B60C 23/10; B60C 29/00
[52] U.S. Cl. .................................. 152/424; 137/223; 141/351; 141/363; 152/427; 417/233
[58] Field of Search .............. 152/415, 418, 423–427, 152/429; 137/223; 141/38, 351, 363; 417/231, 233

[56] References Cited

U.S. PATENT DOCUMENTS

| | | | |
|---|---|---|---|
| 897,811 | 9/1908 | Barrie | 152/424 |
| 1,622,593 | 3/1927 | Landon | 152/425 X |
| 2,214,597 | 9/1940 | Smith | 152/426 |
| 4,269,252 | 5/1981 | Shapiro | 152/426 |

*Primary Examiner*—William A. Powell
*Assistant Examiner*—Thomas Bokan

[57] ABSTRACT

This pressure cuff tire pump device, provides a unique way of inflating an automobile tire, without removing the tire or jacking up the automobile. Primarily, it consists of a flexible rubber casing containing a bladder, which is secured to the wheel having the tire that is to be inflated, by a pair of adjustable straps. The device also includes a hose attached to the bladder, so as to fill the tire with air from the bladder when the automobile is moving. The device further includes an intake valve for receiving air at atmospheric pressure, and an air output valve is included in the hose, to enable the air received in the bladder, to travel into the tire by its valve stem, and the pumping action is supplied by the tire rotating when the automobile is being driven. The device further includes a pressure relief valve, to prevent excessive build-up of air pressure within the bladder and casing of the device.

5 Claims, 1 Drawing Figure

U.S. Patent  Feb. 21, 1984  4,432,405
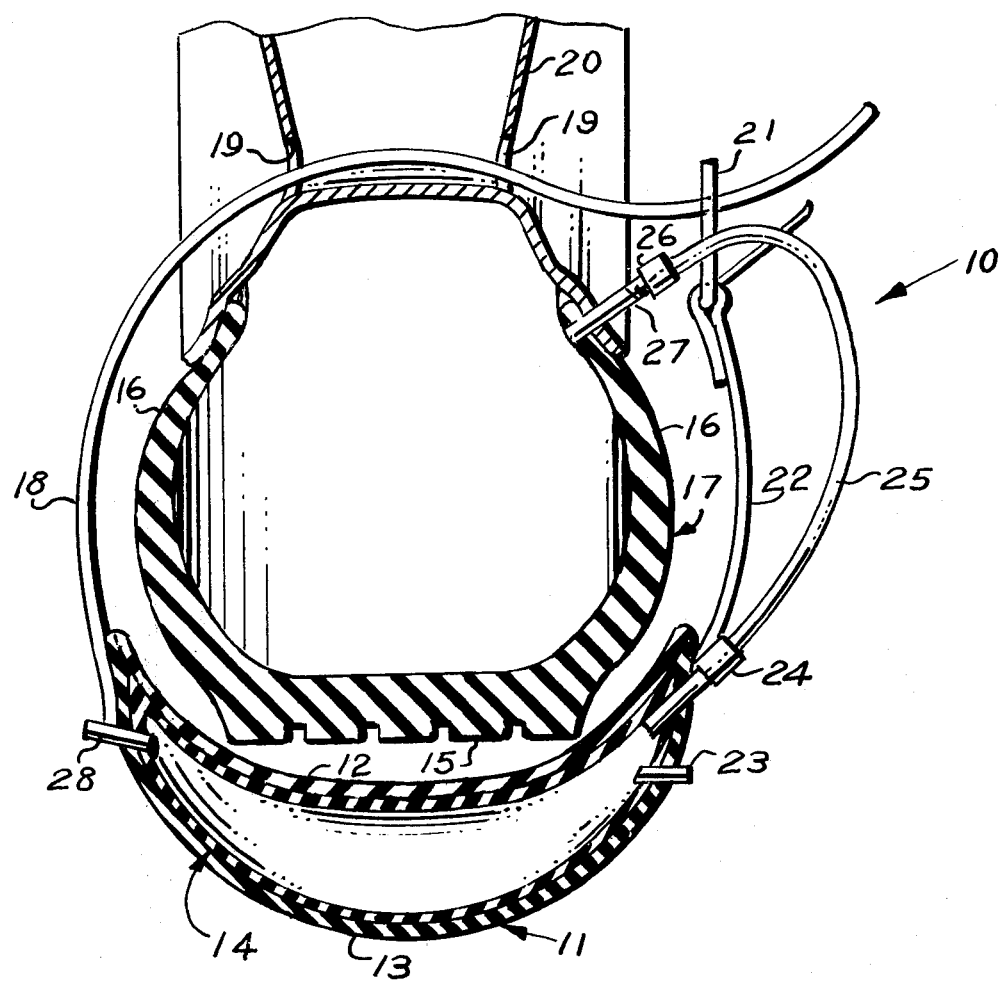

PRESSURE CUFF TIRE PUMP DEVICE

This invention relates to pneumatic devices for automotive vehicles, and more particularly, to a pressure cuff tire pump device.

The principal object of this invention is to provide a pressure cuff tire pump device, which will be unique, in that will enable a motorist to fill his or her deflated tire while on the road, with little effort, and without removing the tire.

Another object of this invention is to provide a pressure cuff tire pump device, which will strap to the wheel hub, having the deflated tire, and it will substantially supply the pre-determined air pressure required for the tire.

Another object of this invention is to provide a pressure cuff tire pump device, which will inflate the tire by the forward motion of the automotive vehicle, by employing differential in pressure means, through the compression and expansion of a bladder in the casing of the cuff.

A further object of this invention is to provide a pressure cuff tire pump device, which will employ attached hose means, for connecting with the tire valve stem.

A still further object of this invention is to provide a pressure cuff tire pump device, which will be safe in use.

Other objects of the invention are to provide a pressure cuff tire pump device, which will be simple in design, inexpensive to manufacture, rugged in construction, and easy to use.

These and other objects will become readily understood, upon a study of the specification, and the accompanying drawing, in which:

The FIGURE is the sole view of the present invention, which is shown in cross-section, and illustrates the straps, prior to being tightened.

Accordingly, device 10 is shown to iclude a resilient flexible rubberized single casing 11, having a top wall 12 and a bottom wall 13, which are secured fixedly together at their longitudinal and end edges, in a suitable manner, common in the art, and not shown. A flexible rubber bladder 14, is received in casing 11, for providing the air pumping action, which hereinafter will be described. The top wall 12 of casing 11, is designed to engage with the outer periphery of the tread 15 and sidewalls 16 of tire 17, and a strap 18 is secured fixedly in a suitable manner, to one upper side portion of casing 11 at one end, and is freely received in a pair of the aligned openings 19, through wheel hub 20. The opposite end of strap 18, is received through buckle 21, which terminates one end of a second strap 22, which has its opposite end fixedly secured to the other upper side portion of casing 11, and buckle 21, serves as a means of tightening and securing device 10 to the tire 17, and the wheel hub 20 and rim combination. An air intake valve 23 is fixedly secured in an opening through one side of bladder 14, and is of the check-type, which prevents the air from escaping therefrom, and intake valve 23 extends from an opening in the casing 11. An air output valve 24, is also fixedly secured in a second opening in bladder 14, and extends outwards from an opening through casing 11. A flexible hose 25 is fixedly secured at one end, to air output valve 24, and its opposite end is secured to a knurled coupling 26, which is threaded onto the end of the tire valve stem 27, so as to enable the bladder 14 to feed air under pressure to tire 17, from bladder 14, when device 10 is in operation. A pressure relief valve 28, is fixedly secured in an opening through the opposite side of bladder 14, and extends outwards from an opening through casing 11, for discharging any excessive build-up of air pressure in bladder 14, over the pre-determined PSI limit, as set by the manufacturer of device 10.

In operation, the user, without jacking up the vehicle, places the cuff device 10 in any position on the tire 17 desired, leaving the casing 11 and bladder 14 combination in the tread 15 area of tire 17. The user then places the strap 18 through the openings 19 of the hub 20 and rim combination. The end of strap 18, is then put through the buckle 21 of the opposite strap 22, and by the buckle 21 means, the straps 18 and 22 are tightened onto the tire 17, so as to tightly engage the top wall 12 of casing 11, against the tread 15 and the side walls 16 of tire 17. After the abovementioned has been accomplished, the knurled coupling 26 of hose 25, is threaded onto the tire valve stem 27.

The user then proceeds to drive the vehicle, and as the tire 17 rotates, the vehicle weight will compress the bladder 14 when it is in contact with the ground surface, and the residual air in the bladder 14, by being compressed by the weight of the vehicle, will discharge by the hose 25, into the tire 17, through the valve stem 27. In each revolution of tire 17, the bladder 14, after vehicle pressure is released therefrom, will cause a vacuum to occur within the bladder and thus, air at atmospheric pressure, will be drawn into the intake valve 23, which will hold it therein. On the following revolution, when the casing 11 is again on the ground surface, the vehicle weight will again compress bladder 14, thus discharging the air under pressure from bladder 14, into the valve stem of tire 17. As the cycle repeats itself when the vehicle is being driven, the tire 17 will become fully inflated, after which, the cuff device 10 is removed therefrom.

It shall be noted that over filling of the bladder 14, is prevented by the pressure relief valve 28, which will discharge air to the outside of the casing 11, because valve 28 is set at a pre-determined over-load pressure.

It shall also be recognized, that casing 11 may be fabricated as a single unit, which will be both a bladder and casing combination.

While various changes may be made in the detail construction, such changes will be within the spirit and scope of the present invention, as defined by the appended claims.

I claim:

1. A pressure cuff tire pump device, comprising, a resilient flexible casing, an inflatable bladder received in said casing, for receiving air at atmospheric pressure and discharging it under pressure into a vehicle tire, a pair of straps secured to said casing, for fastening said casing to a vehicle wheel and its tire, a flexible hose secured to said bladder, for air transfer into said tire, and three valves secured in said bladder, for controlling the air entering and being discharged from said bladder.

2. The combination as set forth in claim 1, wherein said casing includes a top wall and a bottom wall, which are fixedly secured at their outer edges to each other, by suitable means, and said top wall and said bottom wall are arcuately formed and include a hollow compartment, which receives said bladder of similar configuration.

3. The combination as set forth in claim 2, wherein one of said pair of straps is fixedly secured to one side of said casing at one end, in a suitable manner, and its free end is received through openings included through said vehicle wheel, and said free end is removably received through a buckle fixedly secured to the free end of the second strap of said pair of straps, and said buckle provides adjustment means, for tightening said device to said wheel and said tire.

4. The combination as set forth in claim 3, wherein one of said three valves comprises, an air intake valve, which is fixedly secured in a suitable manner, in an opening included through said bladder, and said air intake valve extends through an opening through said bottom wall of said casing, and the residual air in said bladder, is pumped into said tire by compression of said bladder by said wheel when said wheel rotates, and said bladder receives air at atmospheric pressure from the surrounding atmosphere, after compression is released from said bladder, which is caused by vacuum formed in said bladder, during the pumping cycle of said wheel and said device, which is one revolution of said wheel, and when said bladder is compressed again by said wheel, the air under pressure from said bladder, is forced into an air output valve, which comprises the second of said three valves, which is fixedly secured in said bladder, and said hose is secured fixedly to said air output valve at one end, and is removably secured at its opposite end, to the threaded air valve stem of said tire, by an attached coupling, which enables the feeding of the air under pressure from said bladder, into said tire, and partially inflates said tire with a single stroke pumping action, when said vehicle is moving, and a plurality of pumping cycles of said wheel and said cuff device, will inflate said tire to its required air pressure.

5. The combination as set forth in claim 4, wherein a pressure relief valve, comprises the third of said three valves, and said pressure relief valve is fixedly secured in an opening included through said bladder, and extends outward through an opening included through said bottom wall of said casing, and if excessive air pressure builds up in said bladder, the over-load of air is released through said pressure relief valve, which will prevent an explosive rupture of said bladder and casing from occuring.

* * * * *